United States Patent
Campos, II et al.

(10) Patent No.: US 9,987,814 B2
(45) Date of Patent: Jun. 5, 2018

(54) METHOD OF CO-MOLDING

(71) Applicant: NIKE, Inc., Beaverton, OR (US)

(72) Inventors: Fidencio Campos, II, Dallas, OR (US);
Benjamin J. Monfils, Portland, OR (US); Lee D. Peyton, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 8 days.

(21) Appl. No.: 14/641,881

(22) Filed: Mar. 9, 2015

(65) Prior Publication Data

US 2015/0273778 A1 Oct. 1, 2015

Related U.S. Application Data

(63) Continuation-in-part of application No. 14/641,789, filed on Mar. 9, 2015, which is a continuation-in-part
(Continued)

(51) Int. Cl.
*B29D 35/14* (2010.01)
*B29C 49/20* (2006.01)
(Continued)

(52) U.S. Cl.
CPC ............ *B29D 35/142* (2013.01); *A43B 13/16* (2013.01); *A43B 13/20* (2013.01); *A43B 13/223* (2013.01);
(Continued)

(58) Field of Classification Search
CPC .... B29D 35/142; B29D 35/122; B29C 51/12; B29C 2049/2017; B29C 2049/2052; B29C 33/14; B29C 51/267
See application file for complete search history.

(56) References Cited

U.S. PATENT DOCUMENTS 2,128,134 A 8/1938 Giusto
3,251,144 A 5/1966 Weitzner
(Continued)

FOREIGN PATENT DOCUMENTS

CN 1262992 A 8/2000
EP 0215974 A1 * 4/1987 ........... A43B 13/203
(Continued)

OTHER PUBLICATIONS

International Search Report and Written Opinion for International Application No. PCT/US2016/020459, dated Jun. 20, 2016.
(Continued)

*Primary Examiner* — William P Bell
(74) *Attorney, Agent, or Firm* — Honigman Miller Schwartz and Cohn LLP; Matthew H. Szalach; Jonathan P. O'Brien

(57) ABSTRACT

The disclosure is directed to a method for co-molding. A first element has a top surface, an edge, and a protuberance with a base extending down from the top surface. A second element has an edge, an upper surface, and a lower surface. The mold includes a first mold portion defining a co-molding upper surface, and a second mold portion defining a co-molding mold cavity. The first element is placed into the second mold portion with the protuberance base in contact with the second mold portion. The second element is placed on top of the first element. The mold is closed, thereby producing the second element as a chamber.
Fluid under pressure introduced into the chamber forces the second element to conform to the shape of the mold, thereby to affix the first element to the second element. Energy is applied to the mold to co-mold the elements together.

21 Claims, 13 Drawing Sheets

Related U.S. Application Data of application No. 13/773,360, filed on Feb. 21, 2013, now Pat. No. 9,420,848.

(51) Int. Cl.

| | | |
|---|---|---|
| *B29C 51/12* | (2006.01) | |
| *B32B 3/14* | (2006.01) | |
| *A43B 13/20* | (2006.01) | |
| *B29D 35/12* | (2010.01) | |
| *A43B 13/16* | (2006.01) | |
| *A43B 13/22* | (2006.01) | |
| *B29K 75/00* | (2006.01) | |

(52) U.S. Cl.
CPC .............. *B29C 49/20* (2013.01); *B29C 51/12* (2013.01); *B29D 35/122* (2013.01); *B29D 35/128* (2013.01); *B32B 3/14* (2013.01); *B29K 2075/00* (2013.01); *B32B 2250/02* (2013.01); *B32B 2437/02* (2013.01); *Y10T 428/24802* (2015.01)

(56) References Cited

U.S. PATENT DOCUMENTS

| | | | |
|---|---|---|---|
| 3,974,578 A | | 8/1976 | Oettinger et al. |
| 4,245,406 A | | 1/1981 | Landay et al. |
| 4,817,304 A | | 4/1989 | Parker et al. |
| 5,005,299 A | | 4/1991 | Whatley |
| 5,010,662 A | | 4/1991 | Dabuzhsky et al. |
| 5,083,361 A | | 1/1992 | Rudy |
| 5,245,766 A | | 9/1993 | Warren |
| 5,425,184 A | | 6/1995 | Lyden et al. |
| 5,440,826 A | | 8/1995 | Whatley |
| 5,543,194 A | | 8/1996 | Rudy |
| 5,575,969 A | * | 11/1996 | Yamamori .............. B29C 49/20 264/515 |
| 5,595,004 A | | 1/1997 | Lyden et al. |
| 5,685,451 A | * | 11/1997 | Newby, Sr. .............. A45C 3/02 220/4.21 |
| D391,750 S | | 3/1998 | Santos et al. |
| D391,751 S | | 3/1998 | Santos et al. |
| 5,755,001 A | | 5/1998 | Potter et al. |
| 5,771,606 A | | 6/1998 | Litchfield et al. |
| D395,744 S | | 7/1998 | Edington et al. |
| 5,830,553 A | | 11/1998 | Huang |
| 5,987,780 A | | 11/1999 | Lyden et al. |
| 6,009,637 A | | 1/2000 | Pavone |
| 6,026,593 A | | 2/2000 | Harmon-Weiss et al. |
| 6,029,962 A | | 2/2000 | Shorten et al. |
| 6,119,317 A | | 9/2000 | Pfister |
| 6,253,466 B1 | | 7/2001 | Harmon-Weiss et al. |
| 6,503,355 B1 | | 1/2003 | Anzani et al. |
| 6,665,958 B2 | | 12/2003 | Goodwin |
| 6,694,642 B2 | | 2/2004 | Turner |
| 6,763,612 B2 | | 7/2004 | Stubblefield et al. |
| 6,837,951 B2 | | 1/2005 | Rapaport |
| 6,848,201 B2 | | 2/2005 | Staffaroni et al. |
| 6,944,973 B2 | | 9/2005 | Goodwin |
| 7,086,180 B2 | | 8/2006 | Dojan et al. |
| 7,132,032 B2 | | 11/2006 | Tawney et al. |
| 7,331,124 B2 | | 2/2008 | Meschan |
| 7,451,556 B2 | | 11/2008 | Harmon-Weiss et al. |
| 7,624,516 B2 | | 12/2009 | Meschan |
| 8,181,361 B2 | | 5/2012 | Kimura |
| 8,225,533 B2 | | 7/2012 | Meschan |
| 8,296,969 B2 | | 10/2012 | Granger et al. |
| 2002/0113694 A1 | * | 8/2002 | Muirhead ........ B60K 15/03177 340/450 |
| 2005/0000115 A1 | | 1/2005 | Kimura et al. |
| 2005/0132609 A1 | * | 6/2005 | Dojan .................... A43B 13/20 36/29 |
| 2007/0101611 A1 | * | 5/2007 | Li ......................... A43B 13/20 36/28 |
| 2007/0113426 A1 | | 5/2007 | Abadjian et al. |
| 2007/0169376 A1 | * | 7/2007 | Hatfield .............. A43B 7/1415 36/29 |
| 2008/0005929 A1 | | 1/2008 | Hardy et al. |
| 2011/0030240 A1 | | 2/2011 | Schmidt |
| 2011/0131831 A1 | | 6/2011 | Peyton et al. |
| 2011/0131832 A1 | | 6/2011 | Brandt et al. |
| 2011/0203133 A1 | | 8/2011 | Peyton |
| 2012/0110876 A1 | * | 5/2012 | Lubart ................. A43B 13/223 36/59 C |
| 2012/0117826 A1 | | 5/2012 | Jarvis |
| 2012/0174434 A1 | | 7/2012 | Ellis |
| 2012/0260526 A1 | | 10/2012 | Smith et al. |
| 2013/0167401 A1 | | 7/2013 | Christensen et al. |
| 2014/0230276 A1 | | 8/2014 | Campos, II et al. |
| 2015/0272271 A1 | | 10/2015 | Campos, II et al. |

FOREIGN PATENT DOCUMENTS

| | | |
|---|---|---|
| TW | 551049 U | 9/2003 |
| WO | 2014138322 A1 | 9/2014 |

OTHER PUBLICATIONS

International Search Report and Written Opinion for International Application No. PCT/US2016/020490, dated Jun. 20, 2016.
Office Action dated Feb. 25, 2016 in U.S. Appl. No. 14/641,789.
International Search Report and Written Opinion for International Application No. PCT/US2014/017310, dated Jul. 22, 2014.
Office Action dated May 9, 2016 in U.S. Appl. No. 14/641,789.
Amendment filed Aug. 9, 2016 in U.S. Appl. No. 14/641,789.
Final Office Action dated Aug. 29, 2016 in US. Appl. No. 14/641,789.
United States Patent and Trademark Office, Non-final Rejection issued for U.S. Appl. No. 14/641,789, dated Dec. 27, 2016 (17 pages).
State Intellectual Property Office, Office Action and Search Report issued for Chinese Patent Application No. 201480010015.4, dated May 27, 2016 (23 pages).
ROC (Taiwan) Intellectual Property Office, Office Action issued for Taiwanese Patent Application No. 105107254, dated Mar. 23, 2017 (14 pages).

* cited by examiner

METHOD OF CO-MOLDING

CROSS-REFERENCE TO RELATED APPLICATIONS

This application is a continuation-in-part of Campos I I, et al., U.S. co-pending application Ser. No. 14/641,789, filed on even date herewith, entitled "Article Of Footwear Having A Sole Structure Including A Fluid-Filled Chamber And An Outsole, The Sole Structure, And Methods For Manufacturing," the disclosure of which is hereby incorporated by reference, and which application is a continuation-in-part of Campos I I, et al., United States Patent Application Publication 2014/0230276, published Aug. 21, 2014, and entitled "Article of Footwear Incorporating a Chamber System and Methods for Manufacturing the Chamber System," the disclosure of which is entirely incorporated herein by reference.

FIELD

The disclosure is directed to a method of co-molding, to articles such as a sole structure for an article of footwear molded in accordance with the method, and to an article of footwear including the sole structure.

BACKGROUND

The present disclosure relates generally to a method of co-molding. In particular, the disclosure relates to co-molding a first element and a second element to produce an article. The disclosure also relates to the article produced and to an article of footwear including the article.

Co-molding of two or more objects may be a convenient method for producing a unified article. The two or more separate objects may be adhered, cemented, melted, or otherwise associated with each other to produce a unified article. The association may be carried out in a mold, which ensures proper location of the individual objects in relationship with each other.

In co-molding, objects may be fully formed before being placed in the mold, or may be produced in place in the mold. The objects may be cemented together, melted together, or otherwise adhered to produce a unified article. For example, adhesive may be placed on the first elements before a second element is produced in place in the mold. In an article of footwear, the first element may be an outsole and the second element may be a fluid-filled chamber that may provide cushioning, for example, in the midsole.

After the article is produced, the article must be removed from the mold. Typically, removal of the article can be more difficult as the complexity of the mold increases. For example, areas in which inserted first elements closely contact the mold walls increase the difficulty in removing the article. Such areas may exist where it is necessary to ensure registration of a feature on one object with a feature on another object and, therefore, the objects must be held tightly to minimize movement.

The force required to remove an object from the mold also may be increased by the complexity of the objects. For example, an object comprising protuberances may be more difficult to remove from a mold. Such protuberances may be ground-engaging lugs on a shoe outsole, for example. Similarly, a small undercut in a mold may increase the difficulty in removing the article if, as may occur, the mold is not movable so as to accommodate removal of the area undercut.

Therefore, there exists a need in the art for an improved method of co-molding.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
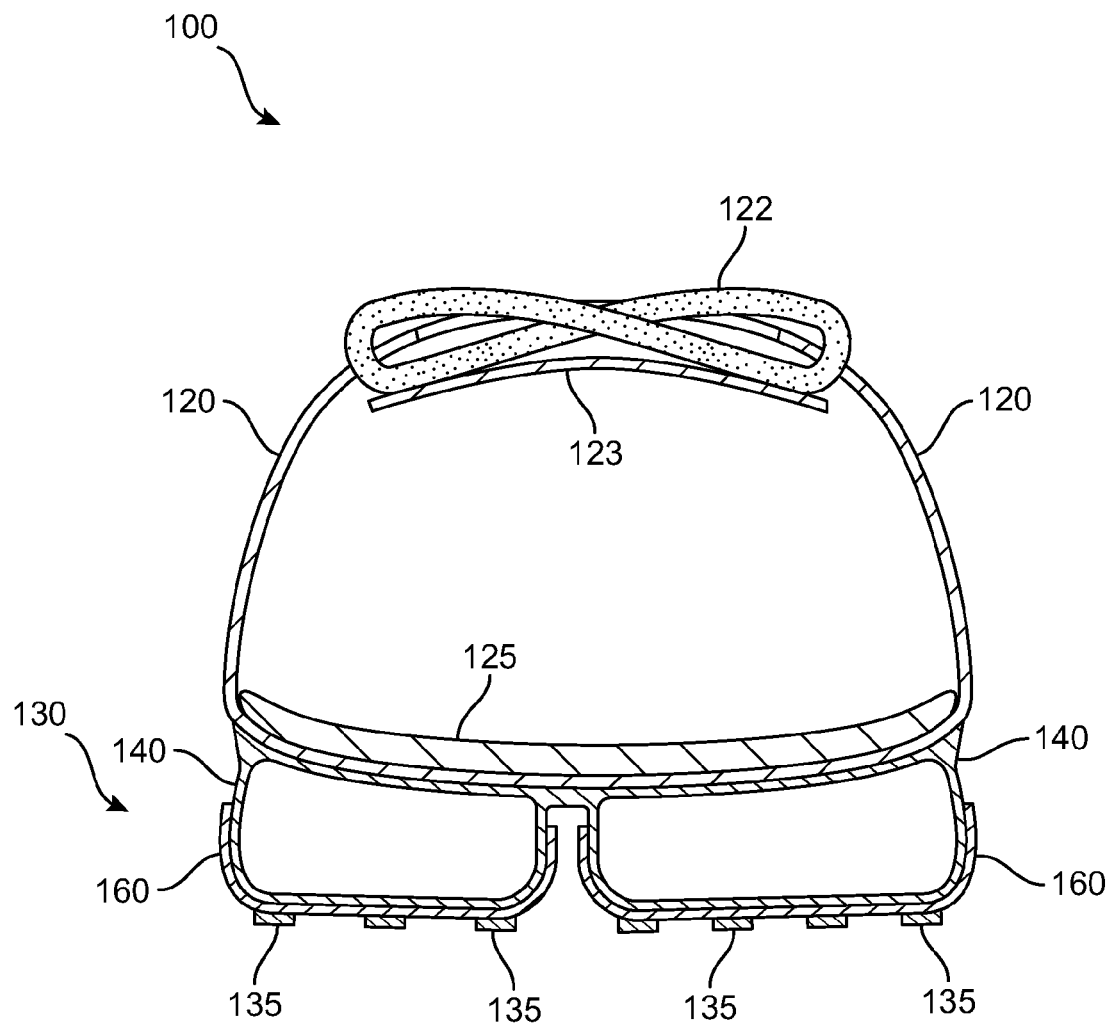
FIG. 1 is a cross-sectional view of an article of footwear including a co-molded article.

In one aspect, the disclosure provides a method for co-molding a first element and a second element to produce a co-molded article. The first element has a top surface, an edge, and a protuberance with a base extending down from the top surface. The second element has an edge, an upper surface, and a lower surface.

A two-piece mold includes a first mold portion and a second mold portion. The first mold portion defines a co-molding upper surface, and the second mold portion defines a co-molding mold cavity into which the first and second elements are received.

In accordance with the method, the first element is placed into the second mold portion with the protuberance base in contact with the second mold portion. The second element is placed into the second mold portion, on top of the first element. The first mold portion and second mold portion are closed into abutting relationship thereby producing the second element as a chamber.

A fluid under pressure is introduced into the second element chamber to force the second element upper surface to conform to the shape of the co-molding upper surface, and the second element lower surface to conform to the shape of the first element top surface, thereby to affix the first element to the second element.

Energy is applied to the mold to co-mold the first and second elements together.

Another aspect of the invention provides a co-molded article having an upper surface, a bottom surface, and an edge. The bottom surface is produced by a first element having a protuberance with a base extending downward from the top surface. The upper surface and edge of the co-molded article are produced by shaping the tops and edges to a mold with the first element in the mold to produce a co-molded article. The first element is affixed to the second element in the mold to produce the co-molded article.

The first element is placed into the second mold portion with the base of the protuberance in contact with the second mold portion. The second mold portion is shaped so as to not contact a significant fraction of the protuberance other than the base. A precursor for a second element is placed in the mold and the mold is closed. The precursor may include more than one component. The second element is placed into the mold on top of the first element and the mold is closed. Fluid under pressure is introduced into the second element chamber that forms to force the upper surface of the second element to the shape of the first mold portion, to conform the lower surface of the second element to the shape of the top surface of the first element, to conform the edge of the second element precursor to the edge surface of the first element or the edge of the second mold portion. Energy is applied to the mold to co-mold the first element and the second element, which are shaped in the mold to form the co-molded article. The first element is affixed to the second element.

Still another aspect of the invention is directed to an article of footwear comprising a co-molded article having an upper surface, a bottom surface, and an edge. The bottom surface, which may be an outsole, is produced by a first element having a protuberance with a base extending downward from the top surface. The upper surface and edge of the co-molded article are produced by shaping the tops and edges to a mold with the first element in the mold to produce a co-molded article. The first element is affixed to the second element in the mold to produce the co-molded article.

The first element is placed into the second mold portion with the base of the protuberance in contact with the second mold portion. The second mold portion is shaped so as to not contact a significant fraction of the protuberance other than the base. A precursor for a second element is placed in the mold and the mold is closed. The precursor may include more than one component. The second element is placed into the mold on top of the first element and the mold is closed. Fluid under pressure is introduced into the second element chamber that forms to force the upper surface of the second element to the shape of the first mold portion, to conform the lower surface of the second element to the shape of the top surface of the first element, to conform the edge of the second element precursor to the edge surface of the first element or the edge of the second mold portion. Energy is applied to the mold to co-mold the first element and the second element, which are shaped in the mold to form the co-molded article. The first element is affixed to the second element. The co-molded article is attached to an upper for an article of footwear to form an article of footwear.

In some embodiments, the second mold portion is configured so as to avoid contact with a significant fraction of the protuberance other than the base.

In some embodiments, the first element is a pre-formed object that essentially retains its shape.

In some embodiments, the first element is a pre-formed object that essentially retains its shape after being placed in the second mold portion.

In some embodiments, the second element is a chamber.

In some embodiments, the second element is a chamber formed in the mold from a first polymer layer and a second polymer layer.

In some embodiments, the second element adheres to the first element.

In some embodiments, fluid is introduced into the second element and is selected from the group consisting of air, liquid, gel, and blends thereof.

In some embodiments, the fluid is a gas.

In some embodiments, the second element is softened by the energy applied to the mold.

In some embodiments, a pressure in the chamber of the second element is adjusted after the co-molded article is demolded.

In some embodiments, wherein the first polymer layer and the second polymer layer comprise the same composition of matter.

In some embodiments, the second polymer layer adheres to the first element as a result of the energy applied to the mold.

In some embodiments, the co-molded article is a sole structure for an article of footwear.

Some embodiments of the method include attaching the co-molded article to an upper of an article of footwear to form an article of footwear.

Another aspect of the disclosure is directed to a co-molded article comprising a first element having a top surface, an edge, and a protuberance with a base extending downward from the top surface, and a second element having an edge, an upper surface, and a lower surface, prepared by these methods.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

In an embodiment, the shaped article may be a cushioning layer and an outsole of an article of footwear. FIG. 1 illustrates such an embodiment. FIG. 1 is a cross-sectional view of an article of footwear including a co-molded article. An article of footwear 100 includes an upper 120 and a sole structure 130. Upper 120 provides a comfortable and secure covering for a foot of a wearer. As such, the foot may be located within upper 120 to effectively secure the foot within article of footwear 100 or otherwise unite the foot and article of footwear 100. Sole structure 130 is secured to a lower area of upper 120 and extends between the foot and the ground to attenuate ground reaction forces (i.e., cushion the foot), provide traction, enhance stability, and influence the motions of the foot, for example. In effect, sole structure 130 is located under the foot and supports the foot.

Upper 120 is depicted as having a substantially conventional configuration. A majority of upper 120 incorporates various material elements (e.g., textiles, foam, leather, and synthetic leather) that are stitched or adhesively bonded together to produce an interior void for securely and comfortably receiving a foot. The material elements may be selected and located in upper 120 to selectively impart properties of durability, air-permeability, wear-resistance, flexibility, and comfort, for example. The void in upper 120 is shaped to accommodate the foot. When the foot is located within the void, therefore, upper 120 extends along a lateral side of the foot, along a medial side of the foot, over the foot, around the heel, and under the foot. A lace 122 extends over a tongue 123. Lace 122 and the adjustability provided by tongue 123 may be utilized in a conventional manner to modify the dimensions of the interior void, thereby securing the foot within the interior void and facilitating entry and removal of the foot from the interior void. Sockliner 125 may enhance the comfort of article of footwear 100.

Further configurations of upper 120 may also include one or more of (a) a toe guard positioned in forefoot region and formed of a wear-resistant material, (b) a heel counter located in heel region for enhancing stability, and (c) logos, trademarks, and placards with care instructions and material information. Given that various aspects of the present discussion primarily relate to sole structure 130, upper 120 may exhibit the general configuration discussed above or the general configuration of practically any other conventional or non-conventional upper. Accordingly, the structure of upper 120 may vary significantly.

Sole structure 130 includes outsole 160 attached to fluid-filled chamber 140. Outsole 160 has ground-engaging protuberances 135 associated therewith.

Figure 2:
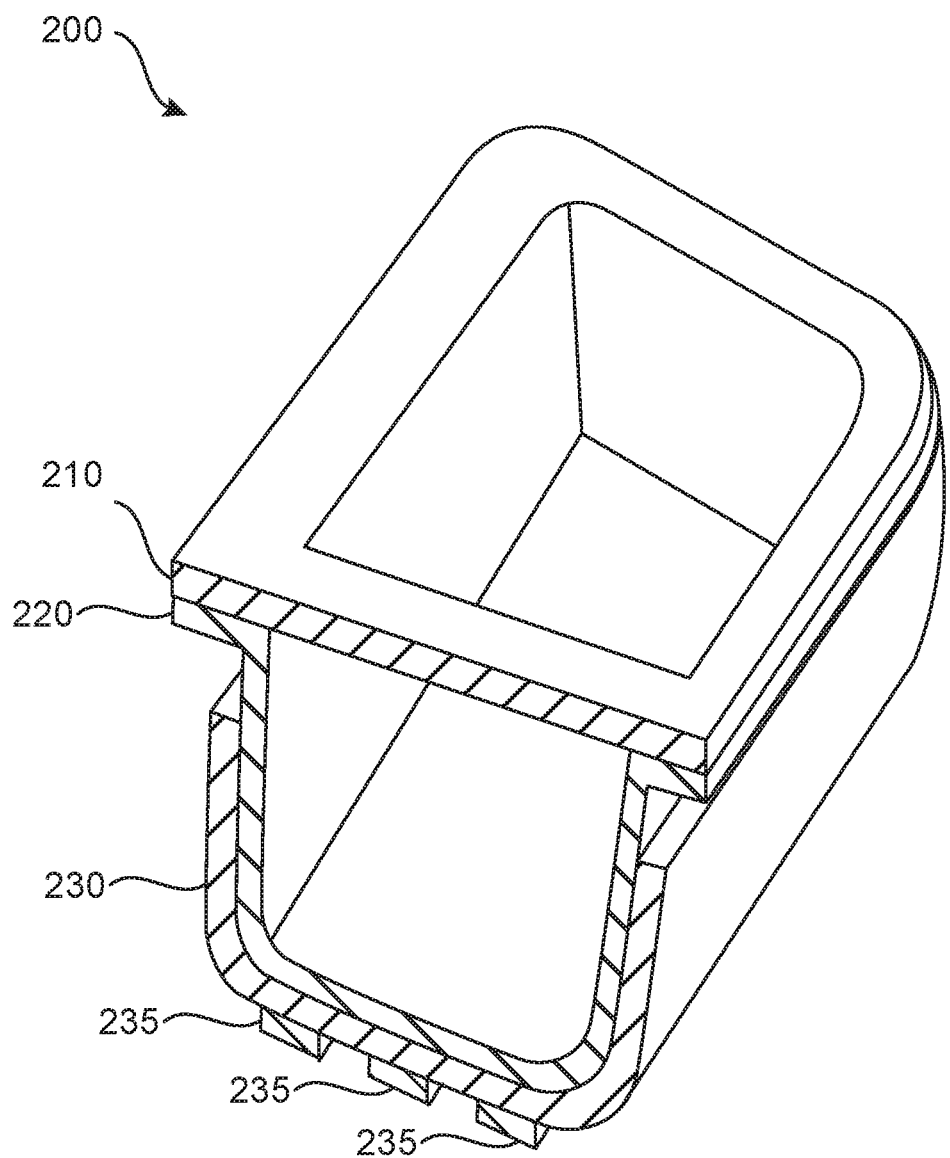
FIG. 2 is a cross-sectional view of a co-molded article.

FIG. 2 illustrates an alternative embodiment of a tank-type article 200 having top 210 associated with tank 220. Tank 220 is at least partially surrounded by case 230 having protuberances 235 extending therefrom. FIG. 2, FIG. 5, FIG. 6, FIG. 12, and FIG. 13, and the accompanying descriptions, explain this alternative embodiment.

Figure 3:
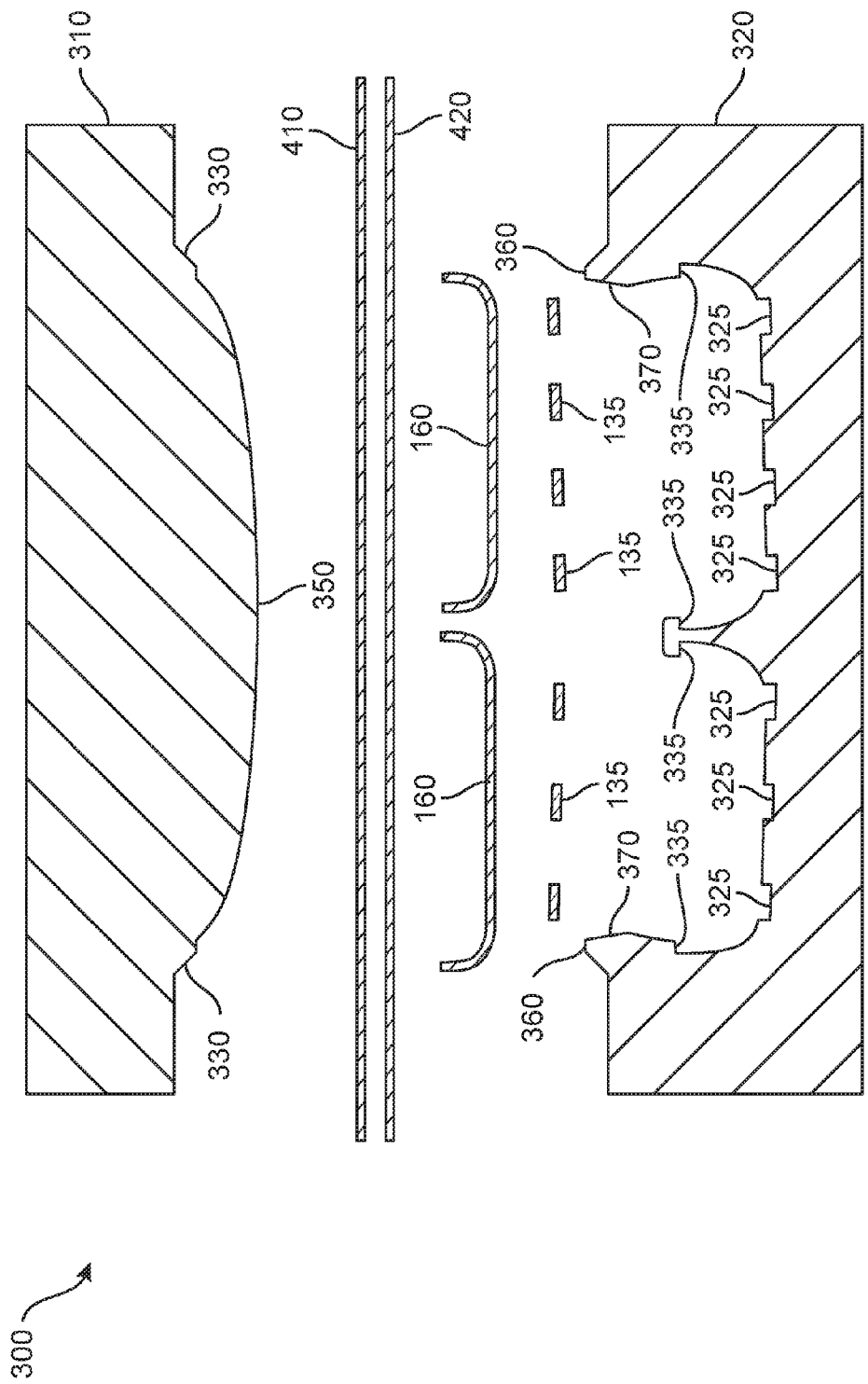
FIG. 3 is a cross-sectional view of an open mold illustrating a relationship of parts for producing an article.
Figure 4:
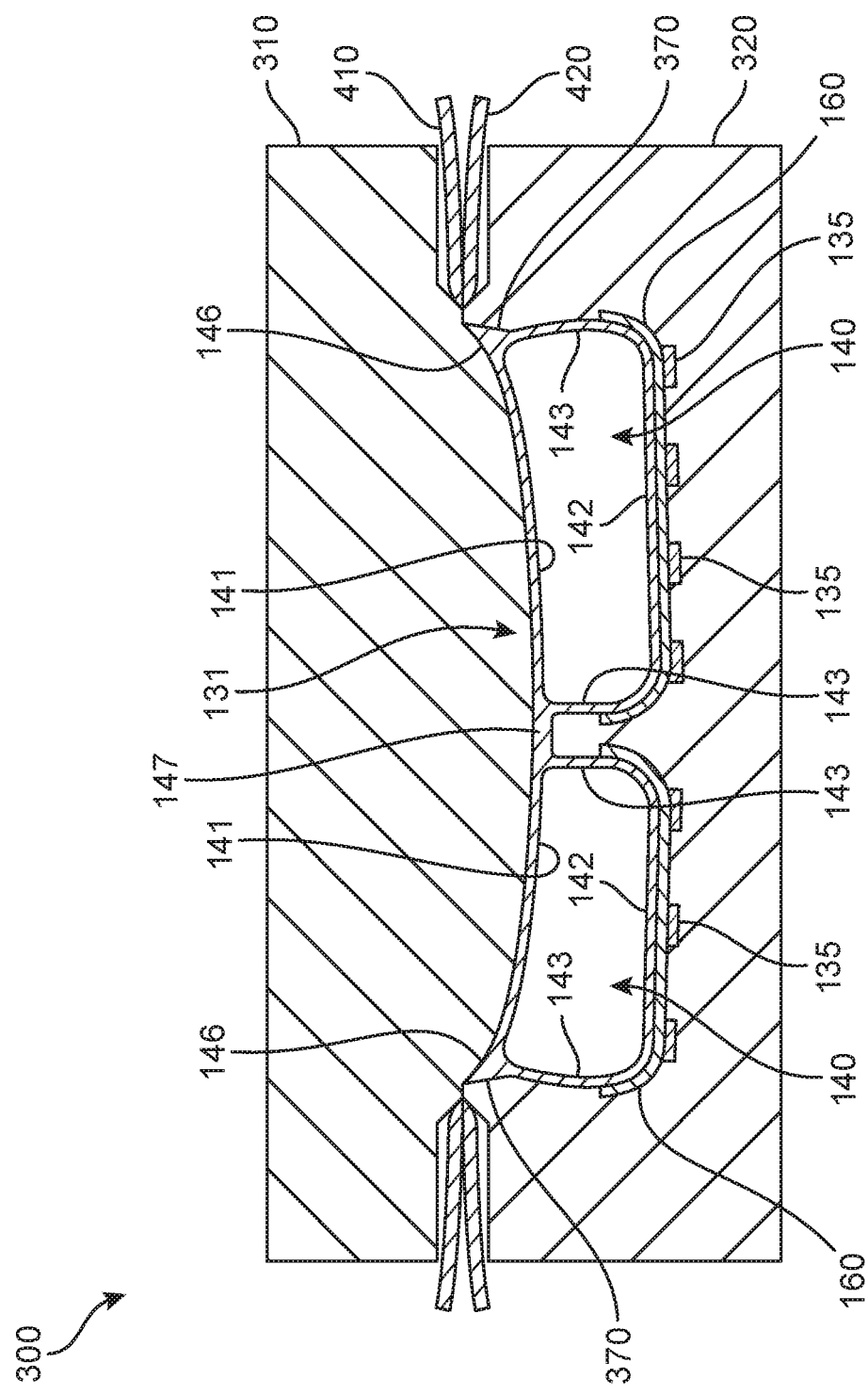
FIG. 4 is a cross-sectional view of a closed mold illustrating a relationship of parts for producing the article of FIG. 3.

FIG. 3 and FIG. 4 illustrate a way of producing a sole structure such as but not limited to sole structure 130 of FIG. 1. FIG. 3 and FIG. 4 depict a cross-section of a mold for co-molding fluid-filled chamber 140 with outsole 160 with protuberances 135 thereon. Outsole 160 may be produced by a number of pre-formed objects or elements assembled in the mold. In some embodiments, outsole 160 wraps at least a portion of edge 143 on fluid-filled chamber 140. Molded article 131 is an embodiment of an article having outsole 160 wrapping a significant portion of the edge of fluid-filled chamber 140. As the components are produced of thermoplastic materials, they may be softened to aid in producing the shapes in the mold.

FIG. 3 and FIG. 4 are cross-sectional depictions of mold 300 for article 131. As shown in FIG. 3 and FIG. 4, fluid-filled chamber 140 is co-molded with outsole 160 present in the mold. Adhesive also may be present on appropriate surfaces.

Stated generally, the co-molded article may be produced in a two-piece mold with an upper and a lower mold portion by placing outsole elements into the lower mold portion, then placing the layers that will form the fluid-filled chamber 140 on top of the outsole elements. The mold is then closed so that the upper and lower mold portions abut one another. The mold is shaped so that the closing the mold results in the formation of the chamber. Fluid under pressure is then introduced into the chamber so that the inflation of the chamber forces the upper surface of the chamber into conforming relationship with the underside of the upper mold portion, and also forces the lower portion of the chamber into conforming relationship with the outside elements underneath. Energy may be applied to the mold as heat, radio frequency, or the like to co-mold the first and second elements together with the chamber inflated and pushing the article against the mold surfaces and the outsole elements. The second element portions such as layers of polymer may be provided in the mold as a precursor for the completed product. Such precursor may be formed in the mold as part of the co-molding process as described herein, or may be provided as completely pre-formed chamber that is ready for inflation.

A variety of manufacturing processes may be utilized to produce sole structure 131. In some embodiments, mold 300 that may be utilized in the manufacturing process is depicted as including a first mold portion 310 and a second mold portion 320. Mold 300 is utilized to produce fluid-filled chamber 140 from a first polymer layer 410 and a second polymer layer 420, which are the polymer layers producing fluid-filled chamber upper surface 141 and fluid-filled chamber lower surface 142, respectively. More particularly, mold 300 facilitates the manufacturing process by (a) shaping first polymer layer 410 and second polymer layer 420 in areas corresponding with edges 143 of the fluid-filled chambers 140, flange 146, and conduits between chambers, and (b) joining first polymer layer 410 and second polymer layer 420 in areas corresponding with flange 146 and web area 147.

Various surfaces or other areas of mold 300 will now be defined for use in discussion of the manufacturing process. First mold portion 310 includes a first mold portion surface 350, which shapes the top surface of the co-molded article. Various parts of a first element, such as outsole 160, and a second element, such as a fluid-filled chamber 140, are illustrated in FIG. 3. Second mold portion 320 is shaped so as to receive protuberances 135 in close engagement with slots 325 in second mold portion 320. Outsole 160 then is placed in the mold. Outsole 160 fits within undercut 335. Then, second element precursor or first polymer layer 410 is put into place to become the top surface of the article and second element precursor or second polymer layer 420 produces the bottom 142 of the second element, herein the fluid-filled chamber, when the article is molded.

As first mold portion 310 and second mold portion 320 are moved toward each other, various techniques may be utilized to draw first polymer layer 410 and second polymer layer 420 against surfaces of first mold portion 310 and second mold portion 320, thereby beginning the process of shaping first polymer layer 410 and second polymer layer 420. For example, air may be partially evacuated from the areas between (a) first mold portion 310 and first polymer layer 410 and (b) second mold portion 320 and second polymer layer 420. More particularly, air may be withdrawn through various vacuum ports in first mold portion 310 and second mold portion 320. By removing air, first polymer layer 410 is drawn into contact with the surfaces of first mold portion 310 and second polymer layer 420 is drawn into contact with the surfaces of second mold portion 320. As another example, fluid may be injected into the area between first polymer layer 410 and second polymer layer 420, thereby elevating the pressure between first polymer layer 410 and second polymer layer 420. During a preparatory stage of this process, an injection needle may be located between first polymer layer 410 and second polymer layer 420, and a fluid, such as a gas, a liquid, or a gel, for example, or a blend thereof, then may be ejected from the injection needle such that first polymer layer 410 and second polymer layer 420 engage the surfaces of mold 300. Each of these techniques may be used together or independently.

As first mold portion 310 and second mold portion 320 continue to move toward each other, first polymer layer 410 and second polymer layer 420 are pinched between first mold portion 310 and second mold portion 320. More particularly, first polymer layer 410 and second polymer layer 420 are compressed between pinch surface 330 and pinch edge 360. In addition to beginning the process of separating excess portions of first polymer layer 410 and second polymer layer 420 from portions that form fluid-filled chamber 140, the pinching of first polymer layer 410 and second polymer layer 420 begins the process of bonding or joining first polymer layer 410 and second polymer layer 420 in the area of flange 146.

Following the pinching of first polymer layer 410 and second polymer layer 420, first mold portion 310 and second mold portion 320 proceed with moving toward each other and into a closed configuration, as depicted in FIG. 4. As the mold closes, pinch surface 330 contacts and slides against a portion of second seam-forming surface 370. The contact between pinch surface 330 and second seam-forming surface 370 effectively severs excess portions of first polymer layer 410 and second polymer layer 420 from portions that form fluid-filled chamber 140. The material forming first polymer layer 410 and second polymer layer 420 compacts or otherwise collects to form flange 146. In addition to forming flange 146, first polymer layer 410 and second polymer layer 420 are (a) shaped to produce fluid-filled chamber 140 and (b) compressed and joined to produce web area 147.

When producing of fluid-filled chamber 140 is complete, mold 300 is opened. Fluid then may be injected into forefoot component to pressurize forefoot component fluid-filled chambers 140, thereby completing the manufacture of structure 131. As a final step in the process, structure 131 may be incorporated into a sole structure of an article of footwear 100.

Figure 5:
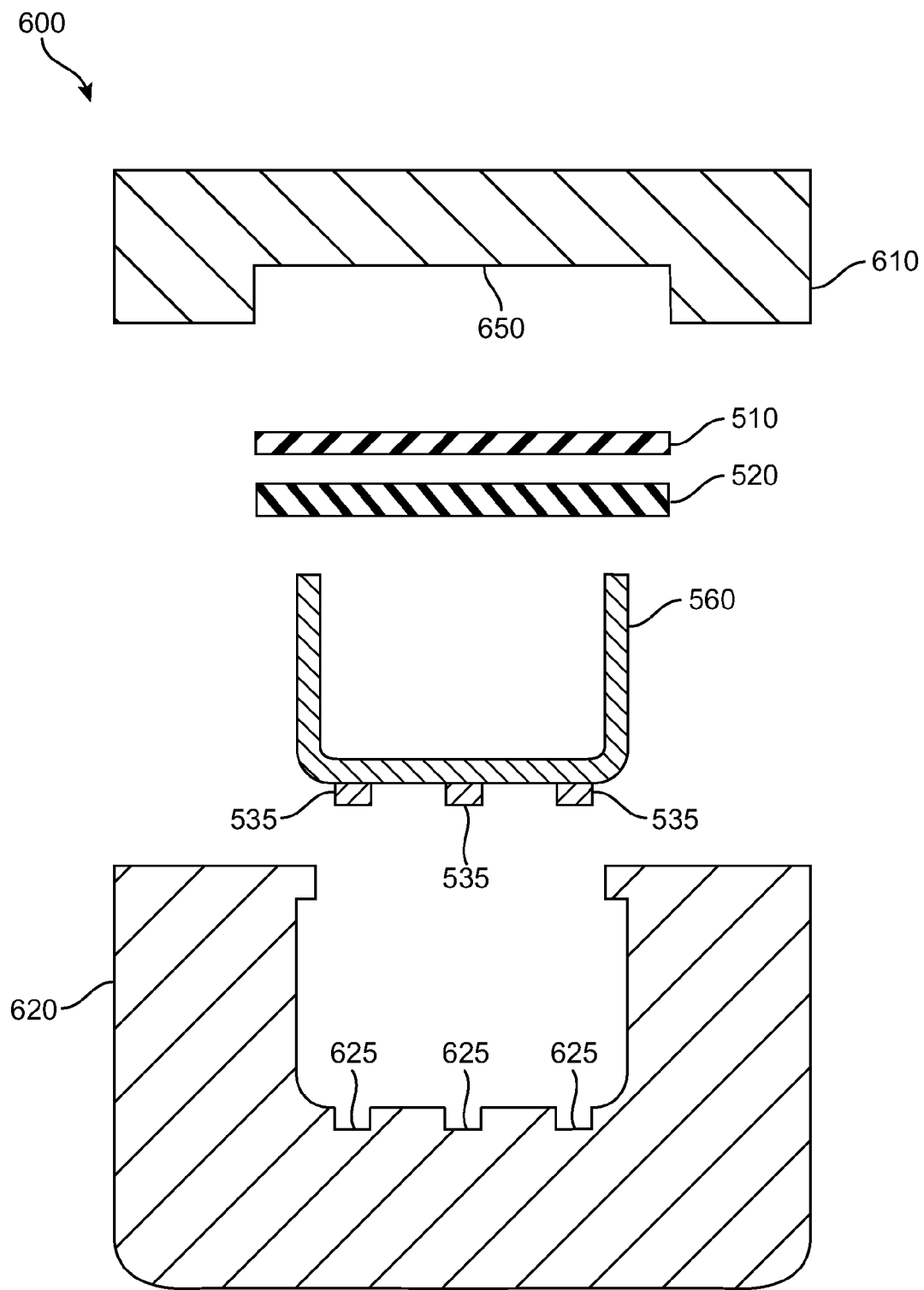
FIG. 5 is a cross-sectional view of an open mold illustrating a relationship of parts for producing an article.

Co-molded articles may have many uses. FIG. 5 illustrates a tank or other container. FIG. 5 depicts molding of a tank or other container. Mold 600 includes first mold portion 610 having mold surface 650. Second mold portion 620 includes slots 625 to securely engage protuberances 535 on first element 560. Second polymer layer 520 and first polymer layer 510 are in position in the open mold. After first element 560 is inserted into the mold, second polymer layer 520 will form the layer of the tank in contact with first element 560. First polymer layer 510 will form the upper surface of the tank.

Figure 6:
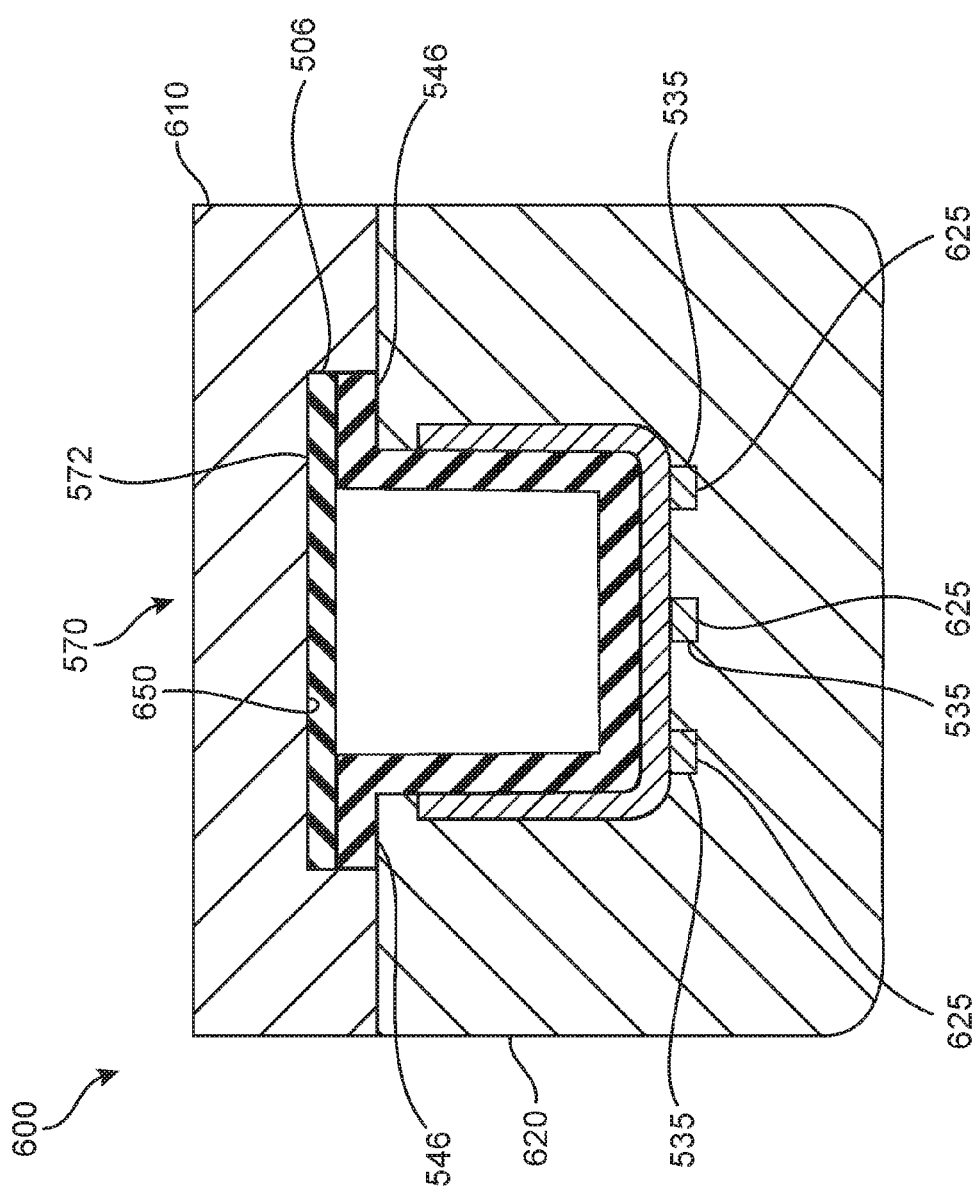
FIG. 6 is a cross-sectional view of a closed mold illustrating a relationship of parts for producing the article of FIG. 5.

FIG. 6 illustrates mold 600 closed to form tank or article 570 within the mold. Surface 650 of first mold portion 610 shapes upper surface 572 of top layer 506 of the article. A sealed tank may be produced by fusing or adhering the polymer layers at flange 546, which may extend around the periphery of the tank. Protuberances 535 on first element 560 fit closely in slots 625 in the second portion 620 of the mold.

Whereas the method and the molds described previously shape parts satisfactorily, the skilled practitioner recognizes that it may be difficult to extract the co-molded article from the mold. So long as the co-molded article is sufficiently flexible and resilient, the article may be deformed slightly to remove it from the undercut mold. However, protuberances formed on the outer surface of a co-molded article in slots and other features that extend the article into the mold may make it very difficult to remove the article from the mold.

Therefore, this disclosure is directed to co-molding articles in a mold that minimizes contact between protuberances on the article and surfaces of the mold. The co-molded article may include a pre-formed article. In some embodiments, the pre-formed article is capable of essentially retaining its shape. In such embodiments, a first element may be a pre-formed element placed in a mold wherein the interior surface is essentially uninterrupted by slots and other features in which protuberances may be formed. Rather, in such embodiments, the first element is placed in the mold with minimal interference or contact between the protuberances and the mold. The element essentially retains its shape when placed in the mold. In some embodiments, a base or end surface of a protuberance may contact the surface of the mold, but the sides of the protuberances are essentially free of contact with the mold. In this way, the co-molded article may be easily removed from the mold.

Figure 7:
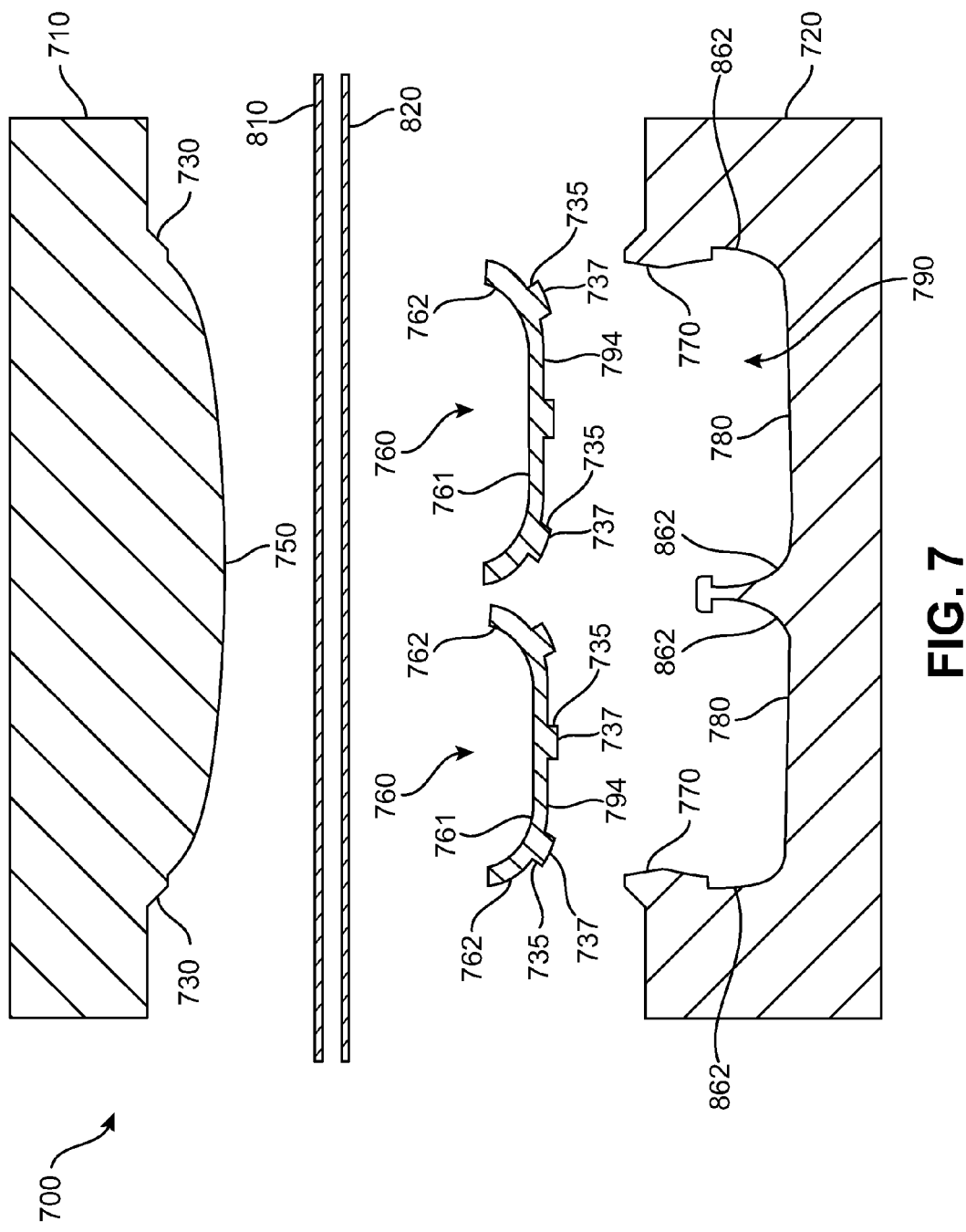
FIG. 7 is a cross-sectional view of an open mold illustrating a relationship of parts for producing an article of the disclosure.
Figure 8:
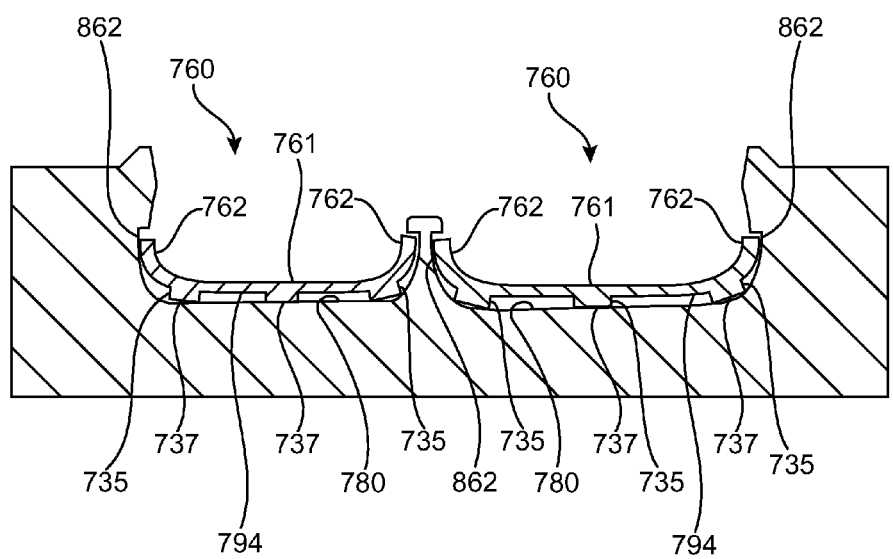
FIG. 8 is a cross-sectional view of one part of an open mold illustrating a relationship of parts for producing the article of FIG. 7.
Figure 9:
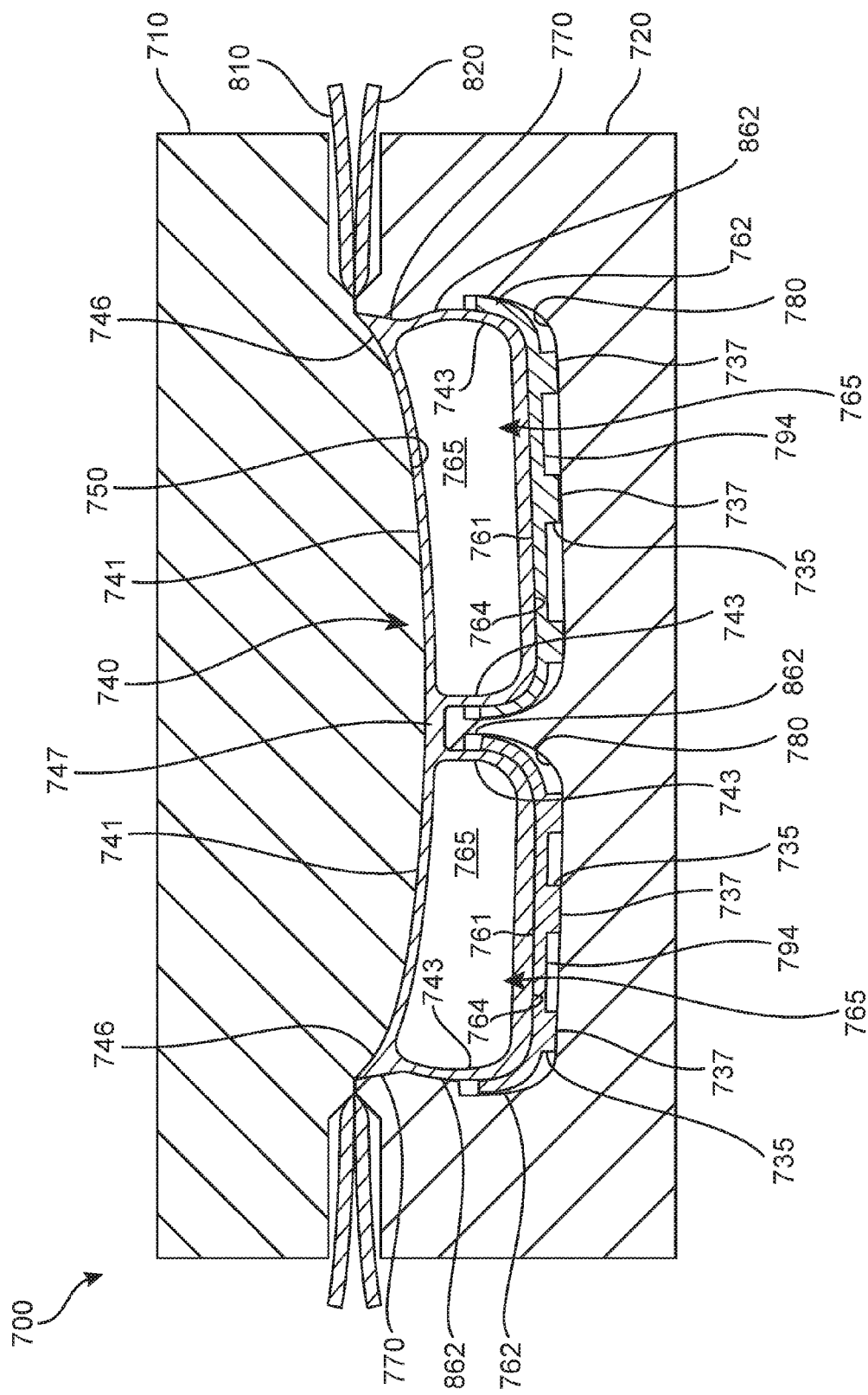
FIG. 9 is a cross-sectional view of a closed mold illustrating a relationship of parts for producing the article of FIG. 7.

In some embodiments, a sole structure for an article of footwear may be made in accordance with a method for co-molding a first element and a second element to produce a co-molded article. FIG. 7, FIG. 8, and FIG. 9 depict stages of this method for co-molding a sole structure of an article of footwear. Mold 700 may have a first mold portion 710 and a second mold portion 720. Shape 750 on first mold portion 710 may form the top surface 741 of the co-molded article.

The first element 760 may have top surface 761, edge surface 762, and protuberance 735 having base 737 opposite top surface 761. Edge surface 762 may extend any distance away from top surface 761. First element 760 also may have bottom surface 794. The second element 765 may have edge 743, upper surface 741, and lower surface 764.

Any suitable polymeric material may be used to produce the first element, which would be an outsole as depicted in FIG. 7. Although each feature is illustrated in the figures as a single layer, each such feature may comprise a single layer of material or multiple layers, and may be thermoformed or otherwise shaped. Examples of polymeric materials that may be utilized for such a sole structure include any of polyurethane, urethane, polyester, polyester polyurethane, polyether, polyether polyurethane, latex, polycaprolactone, polyoxypropylene, polycarbonate macroglycol, and blends thereof. These and other polymeric materials, an exemplary embodiment, and a method for manufacturing them, may be found in co-pending application Ser. No. 13/773,360, filed Feb. 21, 2013, by Campos II et al., and entitled ARTICLE OF FOOTWEAR INCORPORATING A CHAMBER SYSTEM AND METHODS FOR MANUFACTURING THE CHAMBER SYSTEM, the entirety of which is hereby incorporated by reference.

An outsole typically may be produced from any durable material. Typically, outsole material is tough, durable, resistant to abrasion and wear, flexible, and skid-resistant. In some embodiments, polyurethane materials sufficiently durable for ground contact. Suitable thermoplastic polyurethane elastomer materials include Bayer Texin®285, available from Bayer. Elastollan® SP9339, Elastollan® SP9324, and Elastollan® C70S, available from BASF, also are suitable. Polyurethane and other polymers that may not be sufficiently durable for direct ground contact may be used to produce part of an outsole in some embodiments. In such embodiments, a rubber outsole may be adhered or cemented onto the outsole. In embodiments, the outsole material is transparent or translucent. In embodiments, ground-engaging lugs may be integrally produced as part of an outsole, or may be separately produced and adhered to the outsole. The outsole may have a textured ground-engaging surface to improve traction.

As depicted in FIG. 7, FIG. 8, and FIG. 9, first element 760 may be an outsole. For such an embodiment, in accordance with the method, outsole 760 is located in second mold portion 720 with base 737 of protuberance 735 in contact with surface 780 of second mold portion 720. Surface 780 of second mold portion 720 is shaped so as to not contact a significant fraction of protuberance 735 other than base 737. Protuberance 735 may be considered to be a ground-engaging portion, with end 737 thereof being a base that engages the ground. As depicted with particularity in FIG. 7 and FIG. 8, outsole 760 may have a slight arc or curve that cause edge 762 to not contact edge 862 of second mold portion 720. Not all bases 737 may touch surface 780 simultaneously before molding with a second element.

Precursor for a second element, a fluid-filled chamber, is placed in the mold and the mold is closed. First polymer layer 810 may form top surface 741 of second element 765. Second polymer layer 820 may form edge 743 of second element 765 and lower surface or bottom 764 of second element or fluid-filled chamber 765.

Each of first polymer layer 810 and second polymer layer 820 are initially located between first mold portion 710 and second mold portion 720, which are in a spaced or open configuration, as depicted in FIG. 7. In this position, first polymer layer 810 is positioned adjacent or closer to first mold portion 710, and second polymer layer 820 is positioned adjacent or closer to second mold portion 720. A shuttle frame or other device may be utilized to properly position first polymer layer 810 and second polymer layer 820. As part of the manufacturing process, one or both of first polymer layer 810 and second polymer layer 820 are heated to a temperature that facilitates shaping and bonding. As an example, various radiant heaters or other devices may be utilized to heat first polymer layer 810 and second polymer layer 820, possibly prior to being located between first mold portion 710 and second mold portion 720. As another example, mold 700 may be heated such that contact between mold 700 and first polymer layer 810 and second polymer layer 820 at a later portion of the manufacturing process raises the temperature to a level that facilitates shaping and bonding.

Once first polymer layer 810 and second polymer layer 820 are properly positioned, first mold portion 710 and second mold portion 720 translate or otherwise move toward each other and begin to close on first polymer layer 810 and second polymer layer 820.

First polymer layer 810 and second polymer layer 820 are compressed between pinch surface 730 and a pinch edge. In addition to beginning the process of separating excess portions of first polymer layer 810 and second polymer layer 820 from portions that form fluid-filled chamber 765, the pinching of first polymer layer 810 and second polymer layer 820 begins the process of bonding or joining first polymer layer 810 and second polymer layer 820 in the area of flange 746.

Following the pinching of first polymer layer 810 and second polymer layer 820, first mold portion 710 and second mold portion 720 proceed with moving toward each other and into a closed configuration, as depicted in FIG. 4. As the mold closes, pinch surface 730 contacts and slides against a portion of second seam-forming surface 770. The contact between pinch surface 730 and second seam-forming surface 770 effectively severs excess portions of first polymer layer 810 and second polymer layer 820 from portions that form fluid-filled chamber 765. The material forming first polymer layer 810 and second polymer layer 820 compacts or otherwise collects to form flange 746. In addition to forming flange 746, first polymer layer 810 and second polymer layer 820 are (a) shaped to produce fluid-filled chamber 765 and (b) compressed and joined to produce web area 147.

Fluid under pressure may be introduced into fluid-filled chamber 765 to conform upper surface 741 of fluid-filled chamber 765 to the shape 750 of the first mold portion 710, to conform lower surface 764 of fluid-filled chamber or second element 765 to the shape of top surface 761 of first element 760, and to conform edge 743 of fluid-filled chamber 765 to edge surface 762 of first element 760 or edge 862 of second mold portion 720.

Upon injection of fluid into fluid-filled chamber 765, second polymer layer 820 may be urged toward top surface 761 of outsole 760, edge 762 of outsole 760, and edge 862 of second mold portion 720. As the pressure in fluid-filled chamber 765 increases, pressure on outsole top surface 761 may urge bases 737 on protuberances 735 toward surface 780 of second mold portion 720. Similarly, pressure in fluid-filled chamber 765 may urge edge 743 of fluid-filled chamber 765 toward edge 762 of outsole 760, and may urge both toward edge 862 of second mold portion. Edge 743 also may be urged into contact with edge 862 of second mold portion 720 where edge 762 of outsole 760 does not preclude contact therewith.

As can be seen with particularity in FIG. 8 and FIG. 9, bottom surface 794 of outsole 760 typically may not contact bottom surface 780 of second mold portion 720 even after the fluid-filled chamber is fully molded. Although outsole 760 is held in position, demolding is carried out with less force than demolding from a mold that exerts forces on such protuberances, such as in FIG. 3 and FIG. 4. Fluid pressure in fluid-filled chamber 765 may be adjusted after the sole structure is demolded. When fluid-filled chamber 740 is completed, mold 700 is opened. Fluid then may be injected into fluid-filled chambers 745, thereby completing the manufacture of structure 740. As a final step in the process, structure 740 may be incorporated into a sole structure of an article of footwear 100.

Figure 10:
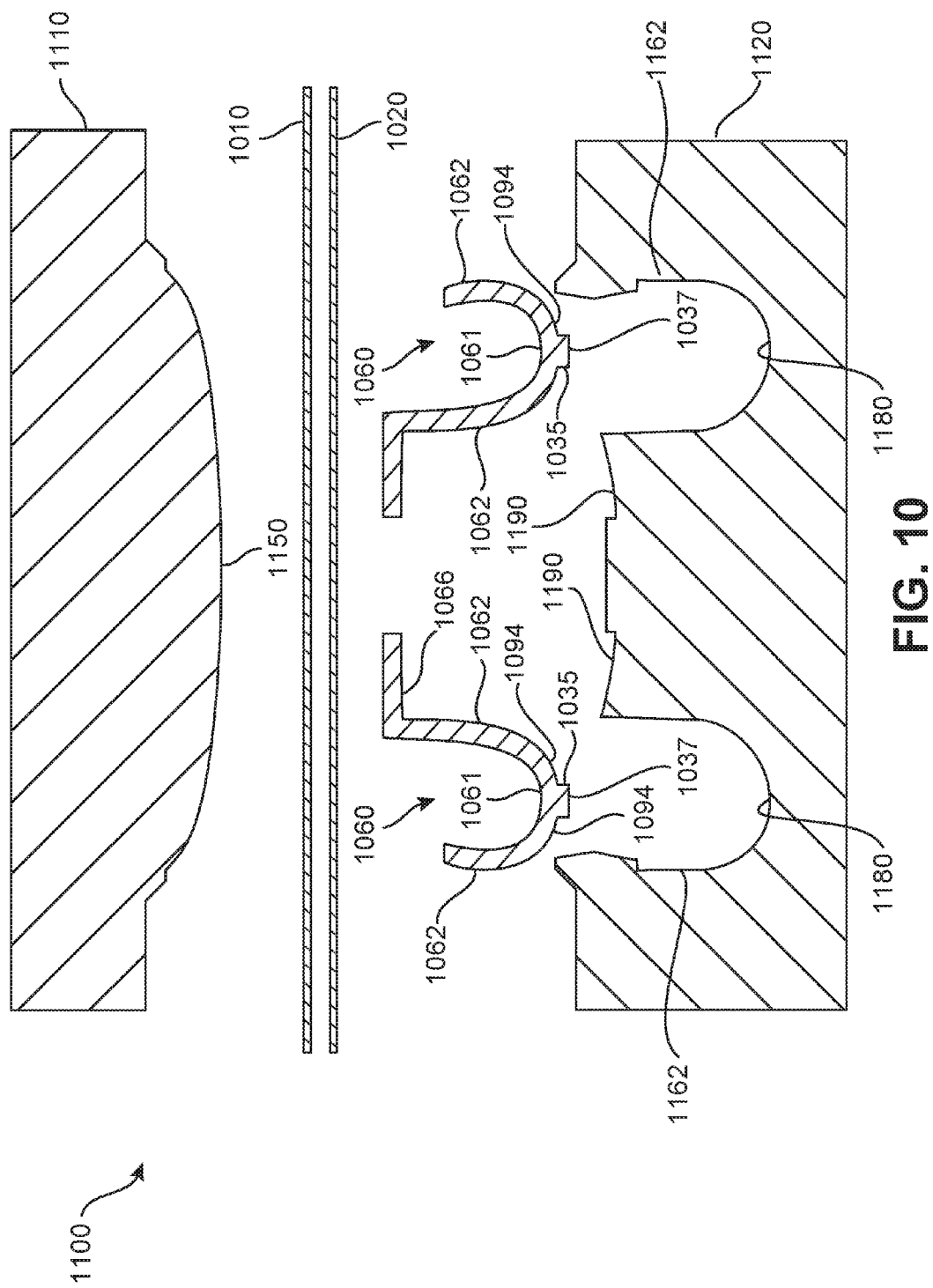
FIG. 10 is a cross-sectional view of an open mold illustrating a relationship of parts for producing another article of the disclosure.
Figure 11:
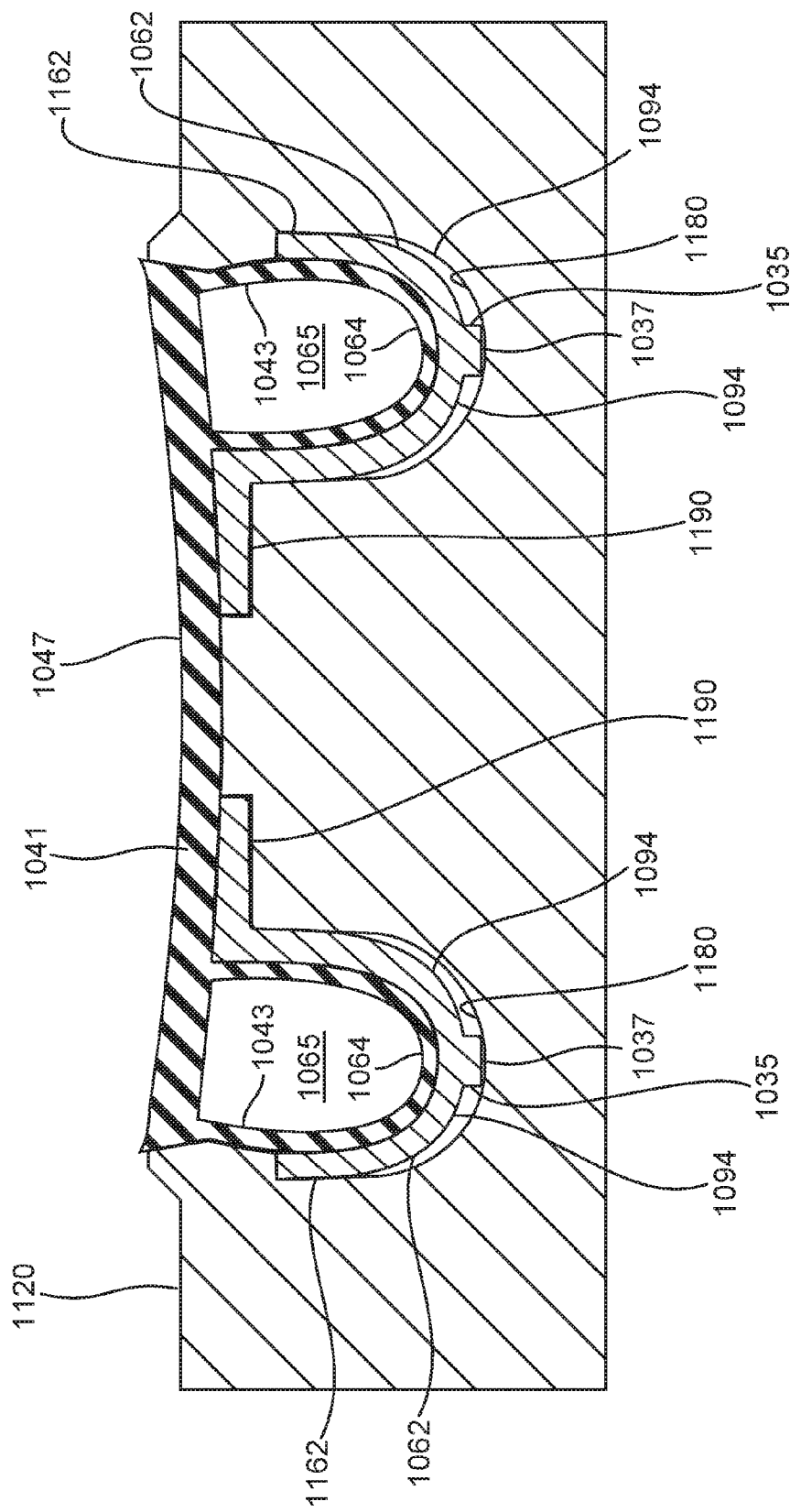
FIG. 11 is a cross-sectional view of a closed mold illustrating a relationship of parts for producing the article of FIG. 10.

FIG. 10 and FIG. 11 illustrate another embodiment of a co-molded article in the produce of a sole structure for an article of footwear that may be made in accordance with a method for co-molding a first element and a second element to produce a co-molded article. Mold 1100 may have a first mold portion 1110 and a second mold portion 1120. Shape 1150 on first mold portion 1110 may produce the top surface 1041 of the co-molded article.

Outsole 1060 may have top surface 1061, edge surface 1062, and protuberance 1035 having base 1037 opposite top surface 1061. The second element 1065 may have edge 1043, upper surface 1041, and lower surface 1064. Any suitable polymeric material may be used to produce the sole structure, as described with regard to FIG. 7, FIG. 8, and FIG. 9.

In some embodiments, such as in the embodiments depicted in FIG. 10 and FIG. 11, first element 1060 may be an outsole. For such an embodiment, in accordance with the method, outsole 1060 is located in second mold portion 1120 with base 1037 of protuberance 1035 in contact with surface 1180 of second mold portion 1120. Surface 1180 of second mold portion 1120 is shaped so as to not contact a significant fraction of protuberance 1035 other than base 1037. Protuberance 1035 may be a ground-engaging portion, with end 1037 thereof being a base that engages the ground. As depicted with particularity in FIG. 10, outsole 1060 may have a slight arc or curve that cause edge 1062 to not contact edge 1162 of second mold portion 1120. Outsole 1060 may include flange 1066, which may provide additional support to the sole structure.

Precursor for a second element, a fluid-filled chamber, is placed in the mold and the mold is closed. First polymer layer 1010 may produce top surface 1041 of second element 1065. Second polymer layer 1020 may form edge 1043 and lower surface or bottom 1064 of second element or fluid-filled chamber 1065. Flange 1066 is urged into position on lip 1190 in second mold portion 1120 by second polymer layer 1020.

Each of first polymer layer 1010 and second polymer layer 1020 are initially located between each of first mold portion 1010 and second mold portion 1020, which are in a spaced or open configuration, as depicted in FIG. 10 and FIG. 11. The polymer layers are placed and heated as described in relationship to FIG. 7, FIG. 8, and FIG. 9.

Fluid under pressure may be introduced into fluid-filled chamber 1065 as it forms to conform upper surface 1041 of fluid-filled chamber 1065 to the shape 1150 of the first mold portion, to conform lower surface 1064 of fluid-filled chamber or second element 1065 to the shape of top surface 1061 of first element or outsole 1060, and to conform edge 1043 of fluid-filled chamber 1065 to edge surface 1062 of outsole 1060 or edge 1162 of second mold portion 1120.

Upon injection of fluid into fluid-filled chamber 1065, second polymer layer 1020 may be urged toward top surface 1061 of outsole 1060, edge 1062 of outsole 1060, and edge 1162 of second mold portion 1120. As the pressure in fluid-filled chamber 1065 increases, pressure on outsole top surface 1061 may urge bases 1037 on protuberances 1035 toward surface 1180 of second mold portion 1120. Similarly, pressure in fluid-filled chamber 1065 may urge edge 1043 of fluid-filled chamber 1065 toward edge 1062 of outsole 1060, and may urge both toward edge 1162 of second mold portion. Edge 1043 also may be urged into contact with edge 1162 of second mold portion 1120 where edge 1062 of outsole 1060 does not preclude contact therewith.

As can be seen with particularity in FIG. 11, bottom surface 1094 of outsole 1060 typically may not contact bottom surface 1180 of second mold portion 1120 even after the fluid-filled chamber is fully molded. Although outsole 1060 is held in position during molding, demolding is carried out with less force than demolding from a mold that exerts forces on such protuberances. Fluid pressure in fluid-filled chamber 1065 may be adjusted after the sole structure is demolded.

Embodiments of the disclosure may be molded from any moldable sheet material, such as thermoplastic polymer. Embodiments also may have any function, and may have any shape that can be molded. Embodiments accommodate pressurization of the mold after the bottom layer of the object is inserted into the mold so that the pressure will urge the layer to contact the fixed object, the edges of the fixed object or of the mold, and urge the fixed object toward the mold.

Figure 12:
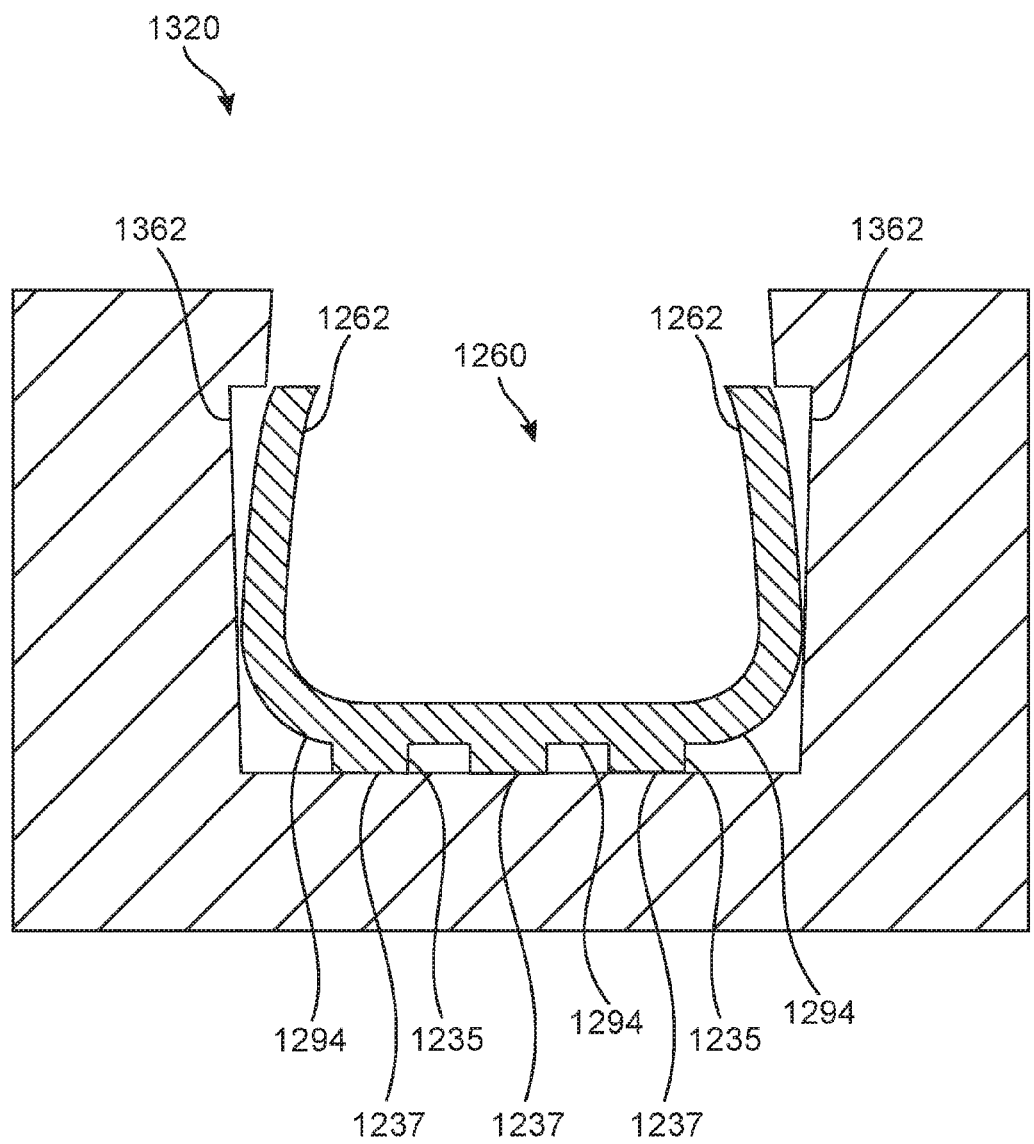
FIG. 12 is a cross-sectional view of an open mold illustrating a relationship of parts for producing still another article of the disclosure.
Figure 13:
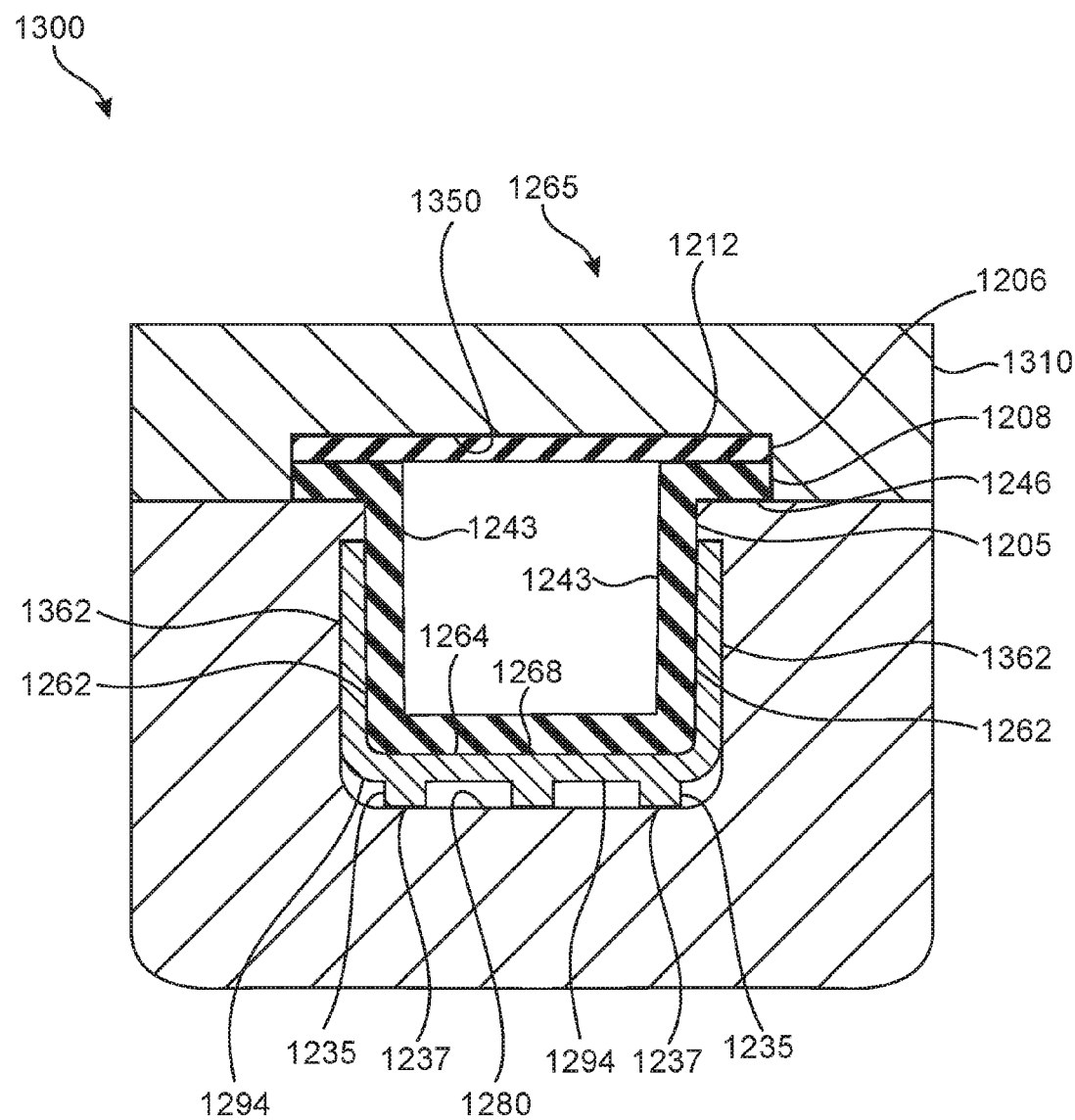
FIG. 13 is a cross-sectional view of a closed mold illustrating a relationship of parts for producing the article of FIG. 12.

In some embodiments, the shape of the co-molded article may produce a container. FIG. 12 and FIG. 13 depict a container having feet. The container may be first element 1260, which may be characterized as case 1260. As depicted in FIG. 12, first element or case 1260 has been placed in second mold portion 1320. Case 1260 may have a foot or protuberance 1235, with the foot having a bottom 1237. Second mold portion 1320 may include bottom surface 1280. In some embodiments, bottom surface 1280 may not contact each bottom 1237 of feet 1235. Case 1260 may have a shape that includes a slight arc. Thus, whether each bottom 1237 of feet 1235 touches bottom surface 1280 depends upon the arrangement of feet 1235 and whether case 1260 may have an arc when placed in second mold portion 1320. In such embodiments, an arc may be exhibited in object edge 1262. As depicted in FIG. 12, object edge 1262 illustrates such an arc, as object edge 1262 is not in contact with mold edge 1362.

Placement of first and second polymer webs between first mold portion 1310 and second mold portion 1320 in mold 1300 before closing the mold, as depicted in FIG. 13, is carried out in essentially the same manner as is the method described with regard to FIG. 7, FIG. 8, and FIG. 9.

In some embodiments, box top 1206, produced from a first polymer layer, may be adhered or otherwise affixed to a second polymer layer 1208 that forms the remainder of the box at flange 1246. The top surface of box top 1206 is shaped by surface 1350 to form box surface 1212.

Fluid may be injected into the volume formed by second polymer layer 1208 and box top 1206. The fluid may be a gas, a liquid, or a gel. Injection of fluid into box 1265 may urge bottom 1268 of second polymer layer 1208 toward top surface 1264 of case 1260, edge 1262 of case 1260, and edge 1362 of second mold portion 1320. As the pressure in box 1265 increases, pressure on first element bottom surface 1264 may urge bases 1237 on protuberances 1235 toward surface 1280 of second mold portion 1320. Similarly, pressure in container 1260 may urge edge 1243 of second polymer layer toward edge 1262 of object 1260, and may urge both toward edge 1362 of second mold portion 1320. Edge 1243 also may be urged into contact with edge 1362 of second mold portion 1320 where edge 1262 of outsole 1260 does not preclude contact therewith.

As can be seen with particularity in FIG. 13, bottom surface 1294 of case 1260 typically may not contact bottom surface 1280 of second mold portion 1320 even after the case is fully molded. Although case 1260 is held in position, demolding is carried out with less force than demolding from a mold that exerts forces on such protuberances 1235. Fluid pressure in box 1265 may be adjusted after the co-molded article is demolded.

Embodiments include articles made in accordance with the method disclosed herein. Embodiments of these articles may be a sole structure for an article of footwear, as described herein. Such a sole structure may be attached to an upper for an article of footwear to produce an article of footwear. The upper for an article of footwear may be any suitable composition of material element. Such material elements may include textiles, foams, leathers, and synthetic leathers, for example. More than one material may be present in an upper. The sole structure may be affixed to the upper by adhesion, sewing, or stitching, or by any method known to the skilled practitioner.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of producing a sole structure for an article of footwear, the method comprising:
   positioning a first outsole element within a mold having a first mold half and a second mold half, the first outsole element including a first surface having an arcuate shape and defining a ground-contacting surface of the first outsole element and a second surface formed on an opposite side of the first outsole element than the first surface and including an arcuate shape, the first surface having a first projection extending outwardly therefrom to a distal end, the distal end defining a lateral gap with the first mold half;

positioning a first barrier member between the first outsole element and the second mold half;

positioning a second barrier member between the first barrier member and the second mold half;

closing the mold to form a cavity defined by the first mold half, the second mold half, and the second surface of the first outsole element;

conforming the first barrier member and the second barrier member to a shape of the cavity to attach the first outsole element to at least one of the first barrier member and the second barrier member; and moving, with the first barrier member, the distal end of the first projection towards the first mold half proximate to the lateral gap.

2. The method of claim 1, further comprising abutting a second projection against a mold surface of the first mold half before closing the mold.

3. The method of claim 1, further comprising forming the first outsole element, the first barrier member, and the second barrier member from a thermoplastic material.

4. The method of claim 1, wherein conforming the first barrier member and the second barrier member to a shape of the cavity includes applying fluid pressure between the first barrier member and the second barrier member.

5. The method of claim 1, further comprising bonding the first barrier member to the second barrier member to define an interior void between the first barrier member and the second barrier member.

6. The method of claim 5, further comprising providing the interior void with pressurized fluid.

7. The method of claim 6, wherein providing the interior void with pressurized fluid causes the at least one of the first barrier member and the second barrier member to contact and bond to the second surface of the first outsole element.

8. The method of claim 1, further comprising positioning a second outsole element within the mold, the second outsole element including a first surface having an arcuate shape and defining a ground-contacting surface of the second outsole element and a second surface formed on an opposite side of the second outsole element than the first surface of the second outsole element and including an arcuate shape.

9. The method of claim 8, wherein positioning the second outsole element within the mold includes spacing the second outsole element away from the first outsole element.

10. A method of producing a sole structure for an article of footwear, the method comprising:

positioning a first outsole element within a mold having a first mold half and a second mold half, the first outsole element including a first surface defining a ground-contacting surface of the first outsole element and opposing the first mold half, a second surface formed on an opposite side of the first outsole element than the first surface, and an edge surface extending between the first surface and the second surface that opposes and defines a gap with, the first mold half, the edge surface defining an outermost edge of the first outsole element;

positioning a first barrier member between the first outsole element and the second mold half;

positioning a second barrier member between the first barrier member and the second mold half;

closing the mold to form a cavity defined by the first mold half, the second mold half, and the second surface of the first outsole element;

conforming the first barrier member and the second barrier member to a shape of the cavity to attach the first outsole element to at least one of the first barrier member and the second barrier member; and moving, with the first barrier member, the outermost edge towards the first mold half.

11. The method of claim 10, wherein positioning a first outsole element within the mold includes positioning a first outsole element having at least one projection extending from the first surface.

12. The method of claim 11, further comprising abutting the at least one projection against a mold surface of the first mold half.

13. The method of claim 11, further comprising inserting the at least one projection into a recess formed in a mold surface of the first mold half.

14. The method of claim 13, wherein inserting the at least one projection into the recess includes inserting the at least one projection into a mating recess.

15. The method of claim 11, further comprising forming the first outsole element, the first barrier member, and the second barrier member from a thermoplastic material.

16. The method of claim 10, wherein conforming the first barrier member and the second barrier member to a shape of the cavity includes applying fluid pressure between the first barrier member and the second barrier member.

17. The method of claim 10, further comprising bonding the first barrier member to the second barrier member to define an interior void between the first barrier member and the second barrier member.

18. The method of claim 17, further comprising providing the interior void with pressurized fluid.

19. The method of claim 18, wherein providing the interior void with pressurized fluid causes the at least one of the first barrier member and the second barrier member to contact and bond to the second surface of the first outsole element.

20. The method of claim 10, further comprising positioning a second outsole element within the mold, the second outsole element including a first surface defining a ground-contacting surface of the second outsole element and opposing the first mold half, a second surface formed on an opposite side of the second outsole element than the first surface of the second outsole element, and a first edge surface extending between the first surface of the second outsole element and the second surface of the second outsole element and opposing the second mold half.

21. The method of claim 20, wherein positioning the second outsole element within the mold includes spacing the second outsole element away from the first outsole element.

* * * * *